US009643565B1

(12) United States Patent
Henck

(10) Patent No.: US 9,643,565 B1
(45) Date of Patent: May 9, 2017

(54) SECONDARY CHAMBER COMBUSTION CONTROL MECHANISM

(71) Applicant: TK Holdings Inc., Armada, MI (US)

(72) Inventor: Jeremy M. Henck, White Lake, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 14/670,373

(22) Filed: Mar. 26, 2015

Related U.S. Application Data

(60) Provisional application No. 61/970,829, filed on Mar. 26, 2014.

(51) Int. Cl.
*B60R 21/264* (2006.01)
*B60R 21/263* (2011.01)
*C06D 5/00* (2006.01)

(52) U.S. Cl.
CPC .......... *B60R 21/264* (2013.01); *B60R 21/263* (2013.01); *C06D 5/00* (2013.01)

(58) Field of Classification Search
CPC .......... B60R 21/264; B60R 2021/2642; B60R 2021/2648; B60R 21/274; B60R 21/263; B60R 2021/2633
See application file for complete search history.

(56) References Cited

U.S. PATENT DOCUMENTS

| | | | |
|---|---|---|---|
| 3,972,545 A | 8/1976 | Kirchoff et al. | |
| 4,136,894 A | 1/1979 | Ono et al. | |
| 5,503,806 A | 4/1996 | Fulmer et al. | |
| 5,556,130 A | 9/1996 | Fulmer | |
| 5,558,367 A | 9/1996 | Cuevas | |
| 5,564,743 A | 10/1996 | Marchant | |
| 5,876,062 A | 3/1999 | Hock | |
| 6,032,979 A | 3/2000 | Mossi et al. | |
| 6,189,924 B1 | 2/2001 | Hock | |
| 6,189,927 B1 | 2/2001 | Mossi et al. | |
| 6,315,322 B1 * | 11/2001 | Mika | B60R 21/2644 280/736 |
| 6,406,053 B1 | 6/2002 | Bayer et al. | |

(Continued)

FOREIGN PATENT DOCUMENTS

DE 4019677 1/1992
DE 19611102 9/1997
(Continued)

OTHER PUBLICATIONS

Presentation to Chrysler entitled "TRW Driver Inflator, ADI9.0/ADI9.2" dated Dec. 8, 1997.
(Continued)

*Primary Examiner* — Barry Gooden, Jr.
(74) *Attorney, Agent, or Firm* — Meunier Carlin & Curfman LLC

(57) ABSTRACT

A gas generating system includes a primary combustion chamber and a secondary combustion chamber. The secondary chamber includes a shell and a cap secured to the shell such that the cap is movable in a first direction responsive to a pressure differential wherein a pressure within the shell is greater than a pressure exterior of the shell. At least one gas flow passage is bounded by the shell and by a cavity extending along an exterior of the cap.

21 Claims, 5 Drawing Sheets

(56) References Cited

U.S. PATENT DOCUMENTS

| | | | |
|---|---|---|---|
| 6,412,815 B1 | 7/2002 | Nakashima et al. | |
| 6,474,684 B1 | 11/2002 | Ludwig et al. | |
| 6,598,901 B2 | 7/2003 | Nakashima et al. | |
| 7,374,204 B2 | 5/2008 | Hoffman et al. | |
| 7,726,687 B2 | 6/2010 | Hoffman et al. | |
| 8,556,294 B1* | 10/2013 | Norman, III | B60R 21/263 102/531 |
| 8,656,838 B1 | 2/2014 | Mayville | |
| 8,820,783 B1 | 9/2014 | Thompson et al. | |
| 2001/0001523 A1* | 5/2001 | Green, Jr. | B60R 21/2644 280/736 |
| 2002/0144621 A1* | 10/2002 | McFarland | B60R 21/2644 102/530 |
| 2003/0146611 A1* | 8/2003 | Kenney | B60R 21/2644 280/736 |
| 2004/0163565 A1* | 8/2004 | Gabler | B60R 21/2644 102/530 |
| 2004/0232680 A1* | 11/2004 | Goetz | B60R 21/261 280/742 |
| 2007/0120349 A1* | 5/2007 | Hoffman | B60R 21/2644 280/741 |
| 2008/0136152 A1* | 6/2008 | McFarland | B60R 21/2644 280/736 |
| 2010/0071580 A1* | 3/2010 | Nakayasu | B60R 21/261 102/530 |
| 2013/0200600 A1* | 8/2013 | Bierwirth | B60R 21/261 280/740 |

FOREIGN PATENT DOCUMENTS

| | | |
|---|---|---|
| DE | 19725418 | 12/1998 |
| DE | 19725452 | 12/1998 |
| DE | 19726295 | 1/1999 |
| EP | 0787630 | 8/1997 |

OTHER PUBLICATIONS

Presentation to Chrysler entitled "ADI9.0/9.2 Driver Inflator" dated Jan. 28, 1997.

* cited by examiner

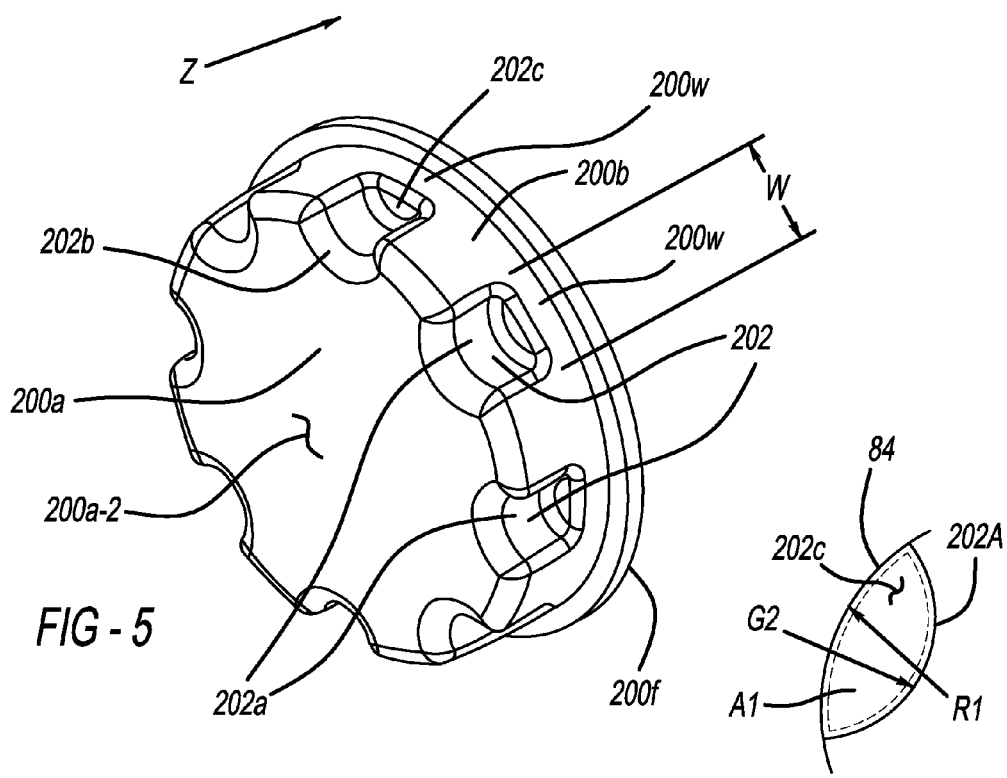
FIG - 5
FIG - 5A
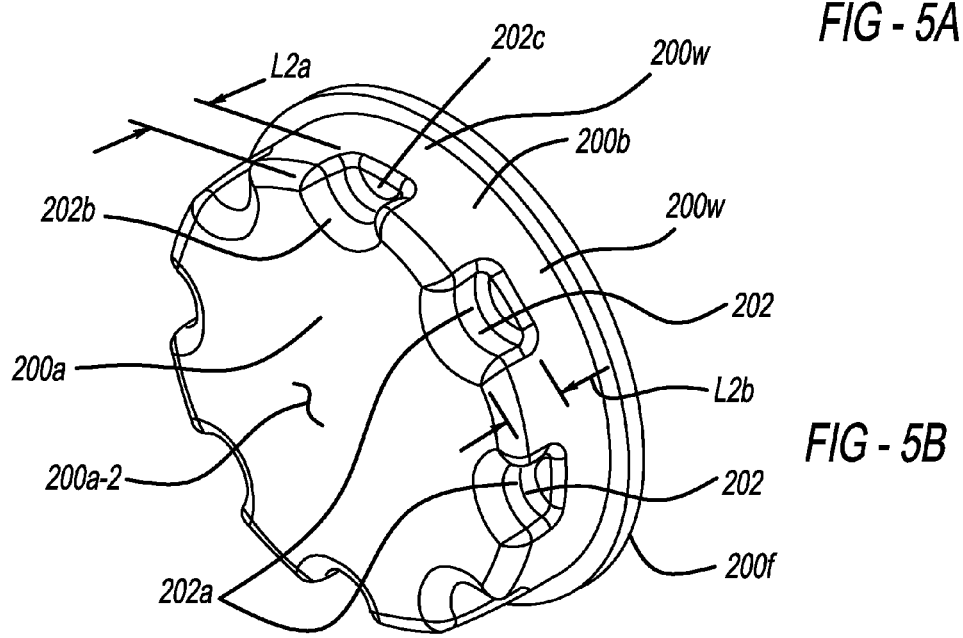
FIG - 5B

SECONDARY CHAMBER COMBUSTION CONTROL MECHANISM

CROSS-REFERENCE TO RELATED APPLICATIONS

This application claims the benefit of U.S. Provisional Application Ser. No. 61/970,829, filed on Mar. 26, 2014, the disclosure of which is incorporated herein by reference in its entirety.

BACKGROUND OF THE INVENTION

The embodiments described herein relate to gas generating systems used to provide gases for gas-actuatable devices incorporated into, for example, a vehicle occupant protection system.

Gas generating systems may be provided with multiple chambers to allow the amount of inflation gas produced to be adjusted based on need. For example, a primary chamber may be activated or deployed based on an estimated need for a relatively smaller quantity of gas. An additional, optional secondary chamber may be independently activated or deployed based on an estimated need for a relatively greater quantity of gas. The secondary chamber may contain a gas generant material therein and may be activated after activation of the first chamber and release of at least a portion of the gas generated in the first chamber. After activation, the secondary chamber generates gas and may release the gas into the primary chamber through openings connecting the two chambers. The gas from the secondary chamber then exits the primary chamber into an associated gas-actuatable device.

In a situation where the secondary chamber is in fluid communication with the primary chamber during combustion of the secondary chamber gas generant material, the pressure within the secondary chamber may fall below a value conducive to efficient combustion of the material.

Therefore, a need exists for improved methods and/or mechanisms for controlling pressure within a secondary chamber in fluid communication with the first chamber, during combustion of a gas generant positioned within the second chamber.

SUMMARY OF THE INVENTION

In one aspect of the embodiments described herein, a gas generating system is provided. The system includes a primary combustion chamber and a secondary combustion chamber. The secondary chamber includes a shell and a cap secured to the shell such that the cap is movable in a first direction responsive to a pressure differential wherein a pressure within the shell is greater than a pressure exterior of the shell. At least one gas flow passage is bounded by the shell and by a cavity extending along an exterior of the cap.

In another aspect of the embodiments of the described herein, a gas generating system is provided. The system includes a primary combustion chamber and a secondary combustion chamber. The secondary chamber has a shell and a cap secured to the shell such that the cap is movable in a first direction responsive to a pressure differential wherein a pressure within the shell is greater than a pressure exterior of the shell. The cap and the shell are structured to form at least one gas flow passage therebetween. The at least one gas flow passage is structured such that a cross-sectional area of an entry into the at least one passage from the secondary chamber remains constant as the cap moves in the first direction.

BRIEF DESCRIPTION OF THE DRAWINGS

The accompanying drawings, which are incorporated in and constitute a part of this specification, illustrate embodiments described herein and together with the description serve to explain principles of the embodiments.

FIG. 5 is a perspective view of a combustion control cap in accordance with an embodiment described herein.

FIG. 5A is a partial cross-sectional plan view of a portion of an exemplary secondary chamber gas exit cavity defined by a cap (as shown in FIG. 5) and a shell in accordance with an embodiment described herein.

FIG. 5B is a perspective view of a combustion control cap in accordance with another embodiment described herein.

DETAILED DESCRIPTION

Figure 1:
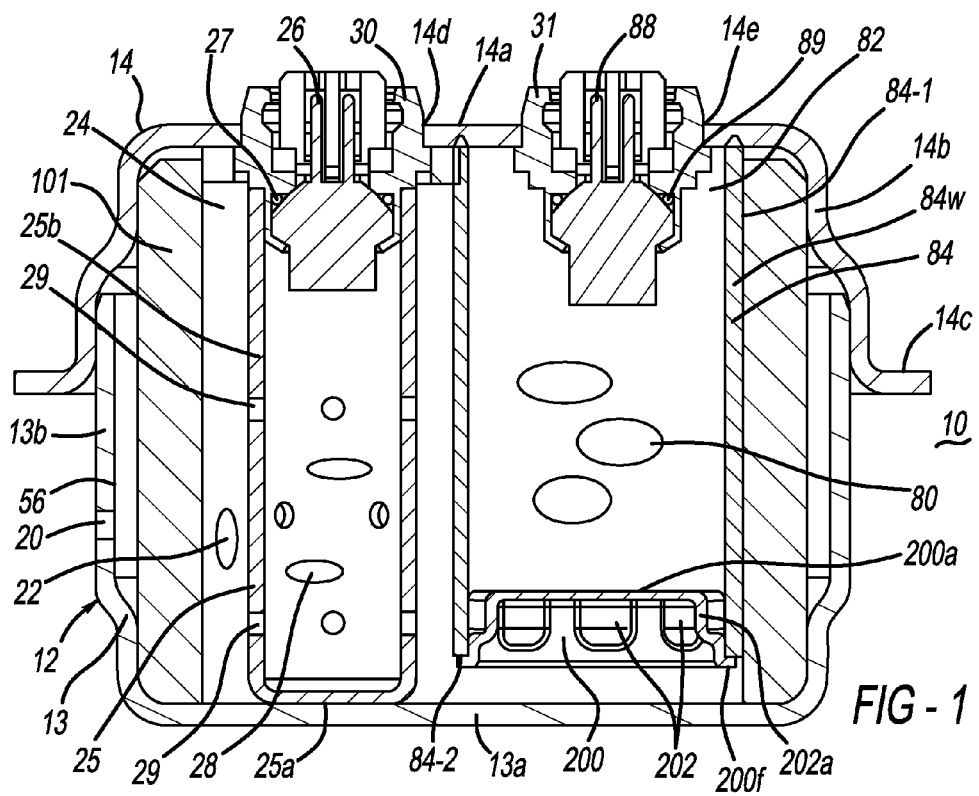
FIG. 1 is a cross-sectional side view of a gas generating system showing an embodiment of a combustion control mechanism in a first state, in which the mechanism is sealing a secondary combustion chamber of the system.

Like reference numerals refer to like parts throughout the description of several views of the drawings. In addition, while target values are recited for the dimensions of the various features described herein, it is understood that these values may vary slightly due to such factors as manufacturing tolerances, and also that such variations are within the contemplated scope of the embodiments described herein.

FIGS. 1-6 show views of an embodiment of a gas generating system 10 incorporating an embodiment of a combustion control mechanism. In the embodiment shown, gas generating system 10 is a dual-stage gas generating system including two separate, independently activatable chambers, a primary chamber 24 and an optional dependent or secondary chamber 82. Depending on the amount of gas required for a particular application, chamber 24 may be deployed alone, or chambers 24 and 82 may be deployed sequentially to inflate or otherwise actuate an associated gas-actuatable device. In another operational mode, both of chambers 24 and 82 are deployed simultaneously.

Gas generating system 10 includes a generally cylindrical housing 12 having a first portion 13 and a second portion 14 attached to the first portion. First portion 13 includes a base portion 13a and a wall 13b extending from the base portion to define a first, primary chamber 24 suitable for receiving therein various components of the gas generating system. Second portion 14 includes a base portion 14a, a wall 14b extending from the base portion, and a flange 14c extending outwardly from wall 14b. Second portion 14 also has a pair of openings 14d and 14e formed therein to enable the mounting of initiators 26 and 88 in the housing for initiating combustion of gas generant materials positioned in the housing, as described below.

In the embodiment shown, a plurality of openings 20 are formed along first portion wall 13b to permit fluid communication between an interior of the housing and an associated airbag or other gas-actuatable device (not shown). Openings 20 may be covered with a foil or shim 56 formed from a material such as aluminum or stainless steel to prevent the incursion of contaminants into gas generating system housing 12 prior to activation of the system. In one embodiment, the foil 56 (sometimes referred to as "burst foil") is of a thickness in the range of about 0.01 to about 0.20 mm. The foil 56 may be adhered to an interior surface of the gas generating system housing through the use of an adhesive.

First and second housing portions 13 and 14 may be cast, stamped, extruded, molded or otherwise formed from a metallic material or other suitable material or materials.

First and second housing closures 30 and 31 are secured to housing second portion 14 within respective ones of openings 14d and 14e so as to form respective fluid-tight seals with the housing portion. First and second housing closures 30 and 31 may be crimped, welded, or otherwise secured within respective openings 14d and 14e of housing second portion 14. Closures 30 and 31 may be cast, stamped, or otherwise formed from a metallic material or any other suitable material or materials.

A first initiator 26 is secured within housing 12 so as to enable fluid communication with an associated booster material 28 (described below). Ignition of booster material 28 ignites a gas generant material 22 positioned within the housing. Initiator 26 is positioned and secured in first housing closure 30 using known methods, such that a fluid-tight seal is formed between the initiator 26 and the first housing closure. In the embodiment shown in FIGS. 1 and 3, an O-ring 27 is compressed between the initiator 26 and the first housing closure 30 to form the seal. Initiator 26 may be formed as known in the art. One exemplary initiator construction is described in U.S. Pat. No. 6,009,809, herein incorporated by reference.

Figure 2:
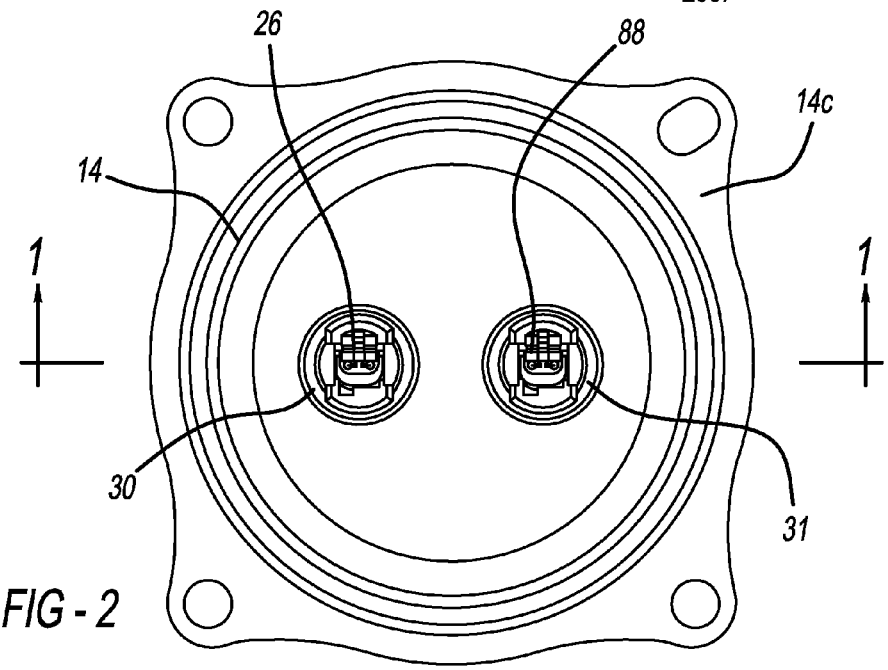
FIG. 2 is a plan view of the embodiment shown in FIG. 1.
Figure 3:
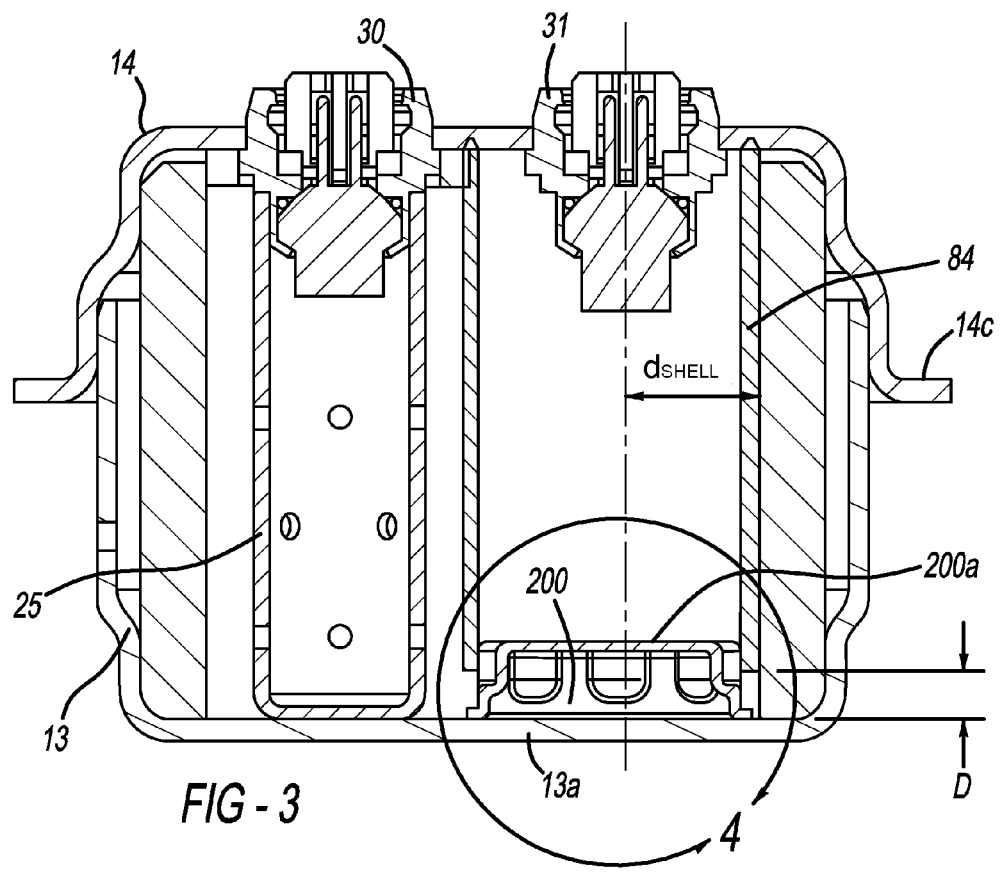
FIG. 3 is the cross-sectional side view of the view of FIG. 1 highlighting a specific portion of the embodiment shown in FIG. 1, and showing the embodiment of the combustion control mechanism in a second state, enabling fluid communication between an interior of the secondary combustion chamber and an exterior of the chamber.

Referring to FIGS. 2 and 3, a quantity of a known or suitable ignition or booster material 28, combustion of which ignites gas generant material 22, may be positioned within housing 12 so as to enable fluid communication between the booster material and gas generant composition 22. In one embodiment, booster material 28 is a known auto-igniting booster material positioned in housing 12 so as to enable thermal communication with the housing prior to activation of the gas generating system, thereby enabling heat transfer from an exterior of the housing to the auto-igniting booster material using the housing as a heat transfer medium. Ignition of the booster material 28 results in ignition of the gas generant material 22, in a manner known in the art. In an embodiment using an auto-igniting booster material, the booster material 28 is formulated to ignite when it reaches a temperature within a predetermined range. The auto-igniting booster material 28 fulfills the functions of both a conventional booster material and a conventional auto-ignition material, enabling ignition of the gas generant material in cases where the housing 12 is exposed to an elevated external temperature resulting from, for example, a flame. This obviates the need for a separate auto-ignition material.

A cup 25 may be positioned within the gas generating system housing to enclose initiator 26 and to house booster material 28. Cup 25 includes a base portion 25a and one or more walls 25b extending from a periphery of base portion 25a to define, in conjunction with the base portion 25a, an interior of the cup. Wall(s) 25b terminate along edge(s) defining an open end of the cup. In the embodiment shown, the open end of the cup is attached along its edges to housing closure 30 using welds or any other suitable method or methods. In one embodiment, the attachment of the cup to the housing closure is configured to form a gas-tight seal between the cup and the housing closure. Openings 29 are formed in wall(s) 25b to enable fluid communication between an interior of the cup and primary chamber 24 after activation of the gas generating system. This enables by-products of combustion of booster material 28 to reach the gas generant material 22. Activation of initiator 26 produces combustion of the booster material, thereby effecting ignition of gas generant composition 22 in a manner known in the art.

Cup 25 may be stamped, extruded, cast, or otherwise suitably formed and may be made from carbon steel, stainless steel, or any other suitable thermally conductive material. In an embodiment incorporating an auto-igniting booster material, cup base portion 25a may be configured to contact first housing portion 13, thereby facilitating transfer of heat from an exterior of housing 12 through base portion 13a and through cup base portion 25a to the auto-igniting booster material inside cup 25. This enables ignition of the auto-igniting booster material when the gas generating system is exposed to flames.

Gas generating system 10 also includes a first inflation fluid source positioned within the outer wall of housing 12 for releasably storing, generating, or otherwise providing an inflation fluid for inflating an inflatable element (for example, an associated airbag) of a vehicle occupant protection system. In the embodiments shown in FIGS. 1-6, the first inflation fluid source comprises gas generant material 22 positioned within chamber 24 formed by housing first portion 13 and second portion 14.

Gas generant 22 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232, 6,887,326 and 6,475,312 each incorporated by reference herein. As used herein, the term "smokeless" should be generally understood to mean such propellants as are capable of combustion yielding at least about 90% gaseous products based on a total product mass; and, as a corollary, less than about 10% solid products based on a total product mass. In some embodiments, the need for a filter may be eliminated by using a gas generant material having the above-described combustion characteristics.

In the embodiment shown in FIGS. 1-6, gas generating system 10 also includes a second inflation fluid source positioned in fluid isolation from the first inflation fluid source. The second inflation fluid source is provided in order to supplement the inflation fluid provided by the first inflation fluid source in certain applications of the gas generating system, as described below.

In the embodiment shown in FIGS. 1-6, the second inflation fluid source comprises a second gas generant composition 80 positioned within a secondary combustion chamber 82 defined by a shell 84, housing portion 14, housing closure 31 and initiator 88, and movable cap 200 (described in greater detail below). Thus, in the embodiment shown, secondary chamber 82 is positioned within primary chamber 24. Second gas generant 80 is formulated so as to be ignitable responsive to activation of a second initiator 88 (described below). Similar to gas generant 22 described above, second gas generant 80 may be any known gas generant composition (including a smokeless gas generant composition) useful for airbag application and is exemplified by, but not limited to, compositions and processes described in U.S. Pat. Nos. 5,035,757, 5,872,329, 6,074,502, 6,287,400, 6,306,232, 6,887,326 and 6,475,312, each incorporated by reference herein.

Second initiator 88 is secured within housing 12 so as to enable fluid communication with second gas generant 80. In the embodiment shown in FIGS. 1 and 2, second initiator 88 is positioned and secured within second housing closure 31 using known methods, such that a fluid-tight seal is formed between the initiator and the second housing closure. In the embodiment shown in FIGS. 1 and 2, an O-ring 89 is compressed between the initiator 88 and the first housing closure to form the seal. Activation of initiator 88 ignites the second gas generant 80. Initiator 88 may be formed as known in the art. One exemplary initiator construction is described in U.S. Pat. No. 6,009,809, herein incorporated by reference.

Shell 84 includes one or more walls 84w defining an interior of the shell. Wall(s) 84w terminate along edge(s) defining open ends of the shell. A first end 84-1 of the shell is attached along its edges to housing portion 14 using welds or any other suitable method or methods. A second, open end 84-2 of the shell opposite first end 84-1 resides within chamber 24 spaced apart a predetermined distance D (FIG. 3) from first housing portion base portion 13a. Shell 84 may be formed from a metal, metal alloy, or other suitable material. In a particular embodiment, the ratio $D/d_{SHELL}$ is within the range $0<D/d_{SHELL}<0.5$, where $d_{SHELL}$ is the outer radius of shell 84. In a particular embodiment, dimension D is within the range of about 3.0-5.0 millimeters inclusive.

Figure 4:
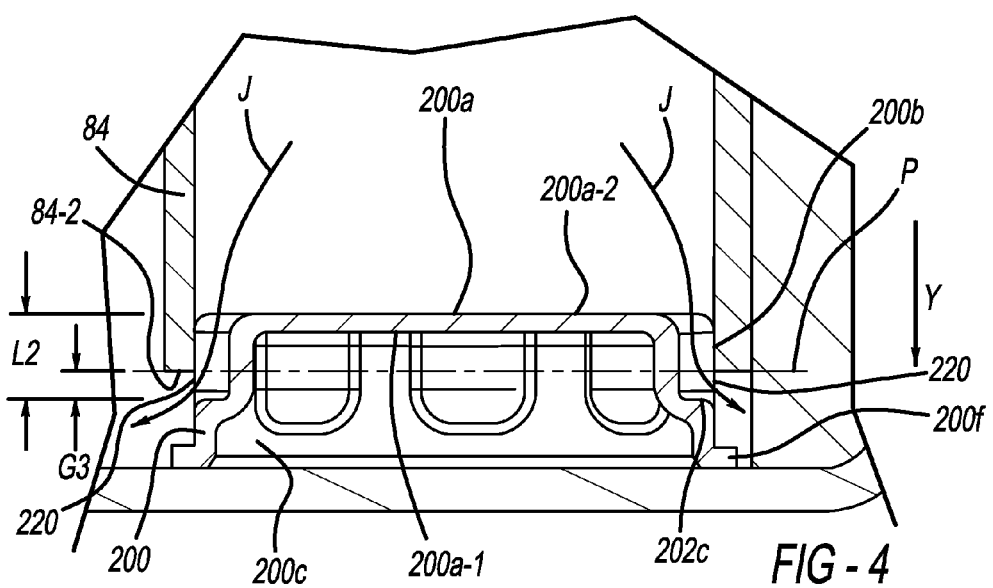
FIG. 4 is a magnified view of the highlighted portion of the view shown in FIG. 3, showing a combustion control cap in accordance with an embodiment described herein in a configuration permitting gas flow along cavities formed in the cap.

A movable combustion control cap 200 is secured to shell second end 84-2 prior to activation of the gas generating system. Cap 200 may be formed from any suitable material, such as a metal, metal alloy, polymer, or other suitable material, using any suitable method. Referring to FIGS. 4 and 5, cap 200 has a base portion 200a and at least one continuous wall 200b extending in a first direction Z from a periphery of the base portion. Base portion 200a and wall 200b combine to define an interior cavity 200c of the cap. Base portion 200a has an interior surface 200a-1 residing within and defining a portion of cavity 200c, and an exterior surface 200a-2 residing opposite interior surface 200a-1.

In the embodiment shown, base portion 200a has a generally circular configuration and wall 200b is generally annular. However, the various portions of cap 200 may have any configuration(s) suitable for performing the functions described herein. A plurality of spaced-apart portions of the exterior of wall 200b are recessed or indented so as to form an associated plurality of grooves or cavities 202. Each cavity 202 has an open end 202b extending along cap base portion 200a at an intersection of an associated recessed wall portion 202a with the cap base portion 200a. Each cavity 202 also has a blind or closed end 202c formed at a predetermined distance L2 (FIG. 4) in a direction Z from cap base portion exterior surface 200a-2. Each of closed ends 202c extends outwardly from an associated recessed wall portion 202a so as to intersect cap wall 200b. An intermediate portion 200w of wall 200b extends between each of cavity closed ends 202c and flange 200f. In the embodiment shown, cavities 202 are semi-cylindrical in shape. However, any suitable cavity shape and/or dimensions may be used according to the requirements of a particular application, to control a flow of gas from shell 84 in a desired manner, as described herein. Lip or flange 200f extends outwardly from an end of wall 200b. In the embodiment shown, lip 200f is a continuous lip or flange, extending along the entire length of the end of the wall 200b.

Referring to FIG. 5B, in another particular embodiment, one or more of cavities 202 are structured so that the length(s) L2a of the cavities are relatively shorter than the length(s) L2b of other cavities, thereby providing associated gas flow passages of correspondingly different lengths. Thus, as the cap 200 is forced in direction Y, the closed ends 202c of the relatively longer cavity (or cavities) will exit the shell 84 before the closed ends 202c of the relatively shorter cavity (or cavities), and the total gas exit area leading from the shell interior (and, consequently, the amount of gas exiting the shell) may be increased in a gradual or stepwise fashion, in any desired manner. In this manner, the length of each cavity may be given a predetermined value needed to facilitate a given desired pressure response within the secondary combustion chamber. For example, if desired, all of the cavity lengths may be different.

In addition, the width W (FIG. 5) of any given cavity 202 may be adjusted so as to control the cross-sectional area of the gas flow passage entry and the passage exit defined by the cavity and shell. Thus, different cavities 202 may have different widths W. Such parameters as the radial depth of each cavity (the distance that the cavity extends from wall 200b toward a radial center of the cap) and the cavity shape may also be adjusted to control the flow passage cross-sectional area.

Tooling for the cap may be designed so that the number, sizes and distribution of the cavities 202 may be adjusted according to the requirements of a particular application, for example, by selection and appropriate placement of inserts usable for forming the cavities.

These methods provide increased flexibility in controlling the pressure within the secondary chamber.

In a particular embodiment, the number of passages 202 is greater than four.

In a particular embodiment, the cap 200 has four cavities spaced around a periphery thereof.

In particular embodiments, the various corners and edges of the cavities are radiused or rounded as shown in the drawings. However, the corners and edges may have any shape or shapes suitable for a particular application.

In the embodiment shown in FIGS. 1-6, cavities 202 are equiangularly spaced apart from each other along wall 200b. However, the angular spacing(s) between cavities may be varied according to the needs of a particular application.

Figure 6:
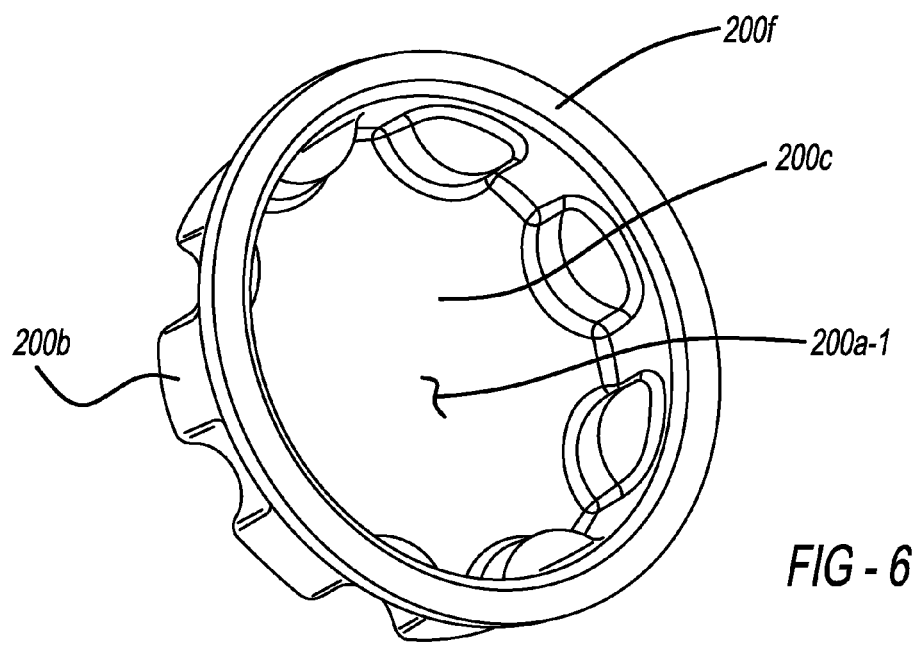
FIG. 6 is another perspective view of the cap shown in FIG. 5.

In a particular embodiment, cavities 202 are arranged around the periphery of cap 200 so as to provide a thrust-neutral exhaust or outflow of gases emanating from the cap between the passage closed ends 202c and shell end 84-2. In one example, for each first cavity formed along the cap, there is a second cavity of the same dimensions located diametrically opposite the first cavity (i.e., along an opposite side of the cap exterior). Such an embodiment of the cap is shown in FIGS. 5 and 6.

In a particular embodiment, cavities 202 are positioned along the cap periphery such that gases emanating from the cavity closed ends are directed toward an interior of the primary combustion chamber (for example, in a direction toward a center of the primary chamber or toward cup 25), rather than directly toward a filter 101 positioned within the housing 12.

Referring to FIGS. 1, 4, 5 and 6, the outer diameter of cap wall 200b is dimensioned so that this portion of the cap is insertable into shell second open end 84-2, and so as to be slidable along the portion of the wall of shell 84 defining the second open end 84-2. Lip 200f and the outer surface of wall 200b are structured so as to (when positioned in shell open end as shown in FIG. 1) abut the wall of shell 84 defining second open end 84-2, so as to form a substantially gas-tight seal responsive to increased pressure in chamber 24 resulting from combustion of gas generant 22. This seal prevents the entry of gases from the chamber 24 into shell 84 during combustion of gas generant 22. Lip 200f also prevents the cap 200 from being forced farther into shell 84 by the increased pressure in chamber 24 during combustion of gas generant 22 in first chamber 24. FIG. 1 shows the cap 200 secured in a position so as to close and seal shell open end 84-2, as described above. The cap is also seated or secured in shell end 84-2 such that it may be forced away from the shell end by a sufficient pressure differential between the interior and exterior of shell 84, as described below.

The internal pressure required in chamber 82 to force the cap out of shell second open end 84-2 may be varied according to the requirements of a particular application, by controlling the relative dimensions of the outer diameter of cap wall 200b and the inner diameter of shell second open end 84-2, thereby controlling the fit between the cap and shell. In a particular embodiment, the outer diameter of cap wall 200b exceeds an inner diameter of shell second open end 84-2 by an amount within the range 0.05 to 0.15 mm inclusive, so as to provide an interference fit between the cap and the shell.

FIGS. 3 and 4 show the cap 200 in a position where flange 200f has been forced away from shell end 84-2, thereby exposing and opening the cap cavity closed ends 202c to chamber 24. Referring to FIG. 4, when cap 200 is forced out of shell end 84-2 far enough so that cavity closed ends 202c are outside the shell open end, multiple flow paths for gases are formed from the shell interior through the cavities 202 and into chamber 24, as indicated by arrows J shown in FIG. 4. The cap is forced from the shell open end until cap flange 200f contacts first housing portion base portion 13a, thereby preventing further motion of the cap away from shell 84.

Cavities 202 are dimensioned to enable a controlled rate of gas flow from the interior of the shell to the exterior of the shell, when closed ends 202c of passages 202 are forced out of shell end 84-2 by internal pressure within shell 84. The flowrate of gases from the interior of shell 84 through cavities 202 and the pressure within the secondary combustion chamber may be controlled by controlling such parameters as the dimensions of cavity open ends 202b, the spacing(s) between the cavity closed ends and the end of the wall defining the open end of shell 84, the dimension(s) of the cavities at the cavity closed ends, the dimensions or cross sectional areas of the cavities 202 between the cavity ends, the number of cavities 202, and other pertinent parameters, according to the requirements of a particular application. One or more of these parameters may be controlled to throttle or impede, in a controlled and predetermined manner, the flow of gases from the interior of the shell 84 to the shell exterior. In this manner, after the cap 200 contacts the base portion 13a, the flow of gases through the cavities 202 is throttled so as to maintain the pressure within the shell 84 at a value within a range that facilitates efficient combustion of the second gas generant 80. These gas flow parameters may be controlled for a given application so that any increase in pressure that would result from continued combustion of the second gas generant 80 is offset or substantially offset by the loss of pressure due to gas flow through the cavities 202 to the exterior of the shell 84. In this manner, the shell internal pressure is maintained at a value within the desired range for efficient combustion of second gas generant 80.

During operation of the embodiment shown in FIGS. 1-6, gases generated within secondary chamber 82 flow into cavities 202 via open cavity ends 202b. After cap wall 200b is separated from shell 84 responsive to a sufficient pressure differential between chambers 24 and 82, the gases flow out of the cavities 202 at cavity closed ends 202c. Referring to FIG. 5A, it is seen that the cross-sectional area A1 of the open end or gas entry area of each cavity 202 is defined by the inner radius R1 of the shell 84 and the dimensions (including radius or diameter G2) of the recessed wall portion 202a of the cavity 202.

Referring to FIGS. 4 and 5A, it is also seen that the size of the gas exit opening formed at each cavity is directly related to the amount G3 by which the cavity closed end 202c is spaced apart from shell end 84-2. This separation G3 controls the cross-sectional area of the exit passage leading from the cavity, which is bounded by the shell and the edges of the associated cavity that extend below the shell. It may also be seen that, as the cap 200 moves out of the shell in direction Y (FIG. 4), the cross-sectional area of the exit opening 220 increases as the length of cavity 202 exterior of the shell 84 increases. Thus, the cross-sectional area of the gas exit opening 220 is variable and constantly varying as the cap moves in direction Y, until the cap contacts base portion 13a. In the embodiment shown, the cross-sectional area of the gas exit opening 220 increases as the cap moves in direction Y, until the cap contacts base portion 13a. However, it is also seen that the cross-sectional area of the gas entry area A1 remains constant during the entire period when the cap is being forced from the shell.

Also, the gas flow from each cavity 202 will be restricted by the smallest cross-sectional area through which the gases flow. Thus, when the cap 200 begins to move away from shell 84 in direction Y, the flow of gases from the cavity will be restricted more by the spacing between cavity closed end 202c and shell 84, because the cross-sectional area of this gas exit region will generally be smaller that the gas entry cross-sectional area A1. However, as the cap continues to move in direction Y, the cross-sectional area of the gas exit region will continue to increase relative to the constant gas entry cross-sectional area A1. At some point (depending on the parameters of a particular design), the gas exit region area may equal or exceed the gas entry cross-sectional area A1, at which point the flow of gases will be constrained by the relatively smaller gas entry cross-sectional area A1.

In a particular embodiment, a cross-sectional area of at least one of cavities 202 taken along a plane P extending perpendicular to a direction Y in which the cap is forced away from the edges of the shell 84 during combustion of gas generant 80, is about 2.27 mm$^2$, within the limits of pertinent manufacturing tolerances.

The desired pressure range for optimum combustion may be a range within which a self-sustaining combustion reaction in the gas generant will be maintained. In one particular embodiment, the desired pressure range has a lower limit of about 20 MPa.

In one particular application, the target pressure range for efficient combustion has a lower limit of 20 MPa and an upper limit which is determined based on the burst pressure of the structural components forming the second chamber, also incorporating a predetermined safety factor therein.

The gas flow parameters may alternatively be specified according to the requirements of a particular application, so as to throttle gas flow from chamber 82 to chamber 24 such that a pressure greater than 20 MPa is maintained within chamber 82 for a time period sufficient to permit full combustion of gas generant material 80 when the pressure within chamber 24 is at or about ambient atmospheric pressure (i.e., after most or all of the gas generated in chamber 24 has exited the chamber through passages 20). In this embodiment, the rate of gas flow from the second chamber is throttled so as to maintain the pressure within second chamber 84 within a range suitable for efficient combustion of the second gas generant material 80, for as much of the combustion process as possible. This facilitates efficient combustion of the second gas generant material 80 after first gas generant material 22 has combusted and the resultant generated gases have exited housing 12, at which point the pressure within chamber 24 (and thus, the back pressure acting on a gas exiting passages 202 is at or close to ambient atmospheric pressure. This condition may occur, for example, in an operational mode where the second chamber 82 is activated shortly after (for example, within about 100 milliseconds after) activation of the first chamber 24.

As used herein, the term "full combustion" is defined as a combustion reaction wherein all combustion products are driven to carbon dioxide ($CO_2$), nitrogen ($N_2$) and/or water ($H_2O$), rather than intermediate combustion products of carbon monoxide (CO), nitrogen oxide (NO) and/or nitrogen dioxide ($NO_2$). As used herein, the term "efficient combustion" of a quantity of gas generant material is defined as a condition wherein at least 90% of the gas generant is fully combusted.

In the manner described above, appropriate configuration of the gas flow parameters in accordance with the principles described herein enables the pressure in the shell 84 to be regulated to affect combustion efficiency within the shell regardless of the pressure in the main housing chamber 24. Factors affecting the total cross-sectional area (or areas) of cavities 202 needed to provide the effect described above include the total mass of gas generant material to be combusted in the shell, the type of gas generant, the composition of the gas generant, the total surface area of the gas generant material to be combusted in the shell, and other pertinent factors.

It will be appreciated that design considerations such as the total mass of gas generant material to be combusted in the shell, the composition of the gas generant, the total surface area of the gas generant material to be combusted in the shell, and other parameters may be iteratively, analytically or otherwise determined so as to enable determination of a total gas flow passage area (as provided by specification of the pertinent cap and shell dimensions) which restricts gas flow from the shell to the extent necessary to provide a pressure range within the shell conducive to efficient combustion of the second gas generant. When properly informed with system performance requirements and data (typically developed in gas generating system design and manufacture) relating to the interactions between these and other design considerations, the desired dimensions of the gas flow passages for any particular application may be iteratively, analytically or otherwise determined, so as to result in a system that provides efficient combustion of the second gas generant 80. Thus, the configurations of the gas flow passages defined by the cap 200 and the effects of other design variables may be either singularly or jointly evaluated analytically and/or on a trial and error basis for their effects on the performance characteristics of the gas generating system. Given information relating to these factors, the structures of the gas flow passages needed to provide the desired throttling and pressurization effects can be determined and provided.

As stated previously, cap 200 also acts to fluidly isolate second gas generant 80 from first gas generant 22. Cap 200 is configured to prevent sympathetic ignition of second gas generant 80 in response to combustion of first gas generant 22, by preventing flame and combustion products from combustion of the first gas generant from reaching the second gas generant. Thus, cap 200 is configured so as not to rupture or fail under elevated pressure and/or temperature in chamber 24 resulting from combustion of gas generant 22.

Cap 200 also blocks the flow of gases from shell 84 into chamber 24 while shell internal pressure increases during combustion of second gas generant 80. Cap 200 may be configured so as to move from its seated, pre-activation position in shell 84 (as shown in FIG. 1) after the internal pressure in shell 84 has reached a value within the range desired for efficient combustion, and/or after the pressure differential between chamber 24 and chamber 82 is at a value within a predetermined range. Thus, cap 200 enables a build-up of internal pressure within chamber 84 to facilitate efficient combustion prior to movement of the cap in a direction away from shell 84.

In one particular embodiment, the cap 200 is configured so as to be forced from the shell 84 when the pressure within the interior of chamber 24 is at about ambient atmospheric pressure and the internal pressure within chamber 82 is at a value within a range determined to promote efficient combustion of the gas generant 80 in the second chamber. As described previously, the elements of the gas generating system previously described may be configured to maintain the pressure in chamber 82 within the range for optimum combustion of gas generant 80 for as much of the combustion operation as possible.

Referring again to FIG. 1, a filter 101 formed from a suitable material (such as wire mesh, for example) may be provided for filtering particulates from the generated gases and/or for cooling the gases. The filter is positioned along a flow path of gases from chambers 24 and 82 to openings 20 so that generated gases are forced to pass through the filter prior to exiting the housing.

Operation of the embodiments of the gas generating system will now be discussed with reference to FIGS. 1-6 and 8.

The gas generating system 10 may be operatively coupled to a crash sensor 210 (FIG. 8) used for detecting the occurrence and severity of a crash event. If the sensor determines that the severity of the crash is above some first predetermined threshold level, the crash sensor may convey an activation signal to initiator 26, thereby initiating combustion of booster propellant 28 in cup 25. By-products resulting from combustion of booster material 28 flow through booster cup openings 29, igniting gas generant 22. The increased pressure in chamber 24 caused by combustion of gas generant 22 causes shims 56 to burst. Inflation gas produced by combustion of the first gas generant then proceeds out of housing 12 through openings 20 into an associated airbag or other gas-actuatable device.

The severity of the crash that is detected by the sensor will determine how the airbag or other gas-actuatable device is actuated. Specifically, if the severity of the crash is only above the first threshold level, then only the first chamber 24 will be activated (as just described) to provide gas to actuate the gas-actuatable device. However, if the severity of the crash is determined to be above the second threshold level, then both the first chamber 24 and the second chamber 82 will be activated to provide gas to actuate the gas-actuatable device. A signal from the crash sensor is then conveyed to second initiator 88, thereby activating second initiator 88 and igniting second gas generant 80. When a sufficient pressure differential is achieved between chambers 82 and 24, cap 200 is detached from shell 84 and forced in direction Y away from the end of the shell. Combustion of the second gas generant is regulated as previously described, with efficient combustion of the supplemental gas generant 80 being facilitated by appropriately configuring the cap opening(s) 202, as previously described. Inflation gas produced by combustion of the second gas generant 80 proceeds out through cap cavities 202, then through openings 20 in housing 12 into an associated airbag or other gas-actuatable device.

In an operational mode where both of chambers 24 and 82 are deployed simultaneously, the crash sensor conveys simultaneous activation signals to initiator 26 and to initiator 88, thereby activating booster propellant 28 in first chamber 24 and second gas generant 80. By-products resulting from combustion of booster material 28 flow through booster cup openings 29, igniting gas generant 22. This mode provides simultaneous or overlapping combustion of gas generants 22 and 80.

The increased pressure in chamber 24 caused by combustion of gas generant 22 causes shims 56 to burst. Inflation gas produced by combustion of the first gas generant then proceeds out of housing 12 through openings 20 into an associated airbag or other gas-actuatable device.

Initially, prior to the escape of a quantity of generated gases from chamber 24 through openings 20, the pressure differential between combusting chamber 24 and combusting chamber 82 will be insufficient to produce movement of cap 200 in a direction away from shell 84 as previously described, thus preventing fluid communication between the chambers. When the pressure in first chamber 24 falls below a predetermined value due to egress of generated gas, a pressure differential will be created between chambers 24 and 82 sufficient to force cap 200 from shell 84, in the manner previously described. After cavity closed ends 202c exit the shell end 84-2, gases generated by combustion of gas generant 80 flow out of chamber 82 and into cavities 202 via cavity open ends 202b, thereafter impinging on and being deflected by cavity closed ends 202c into chamber 24. These gases then flow through openings 20 as previously described.

Figure 7:
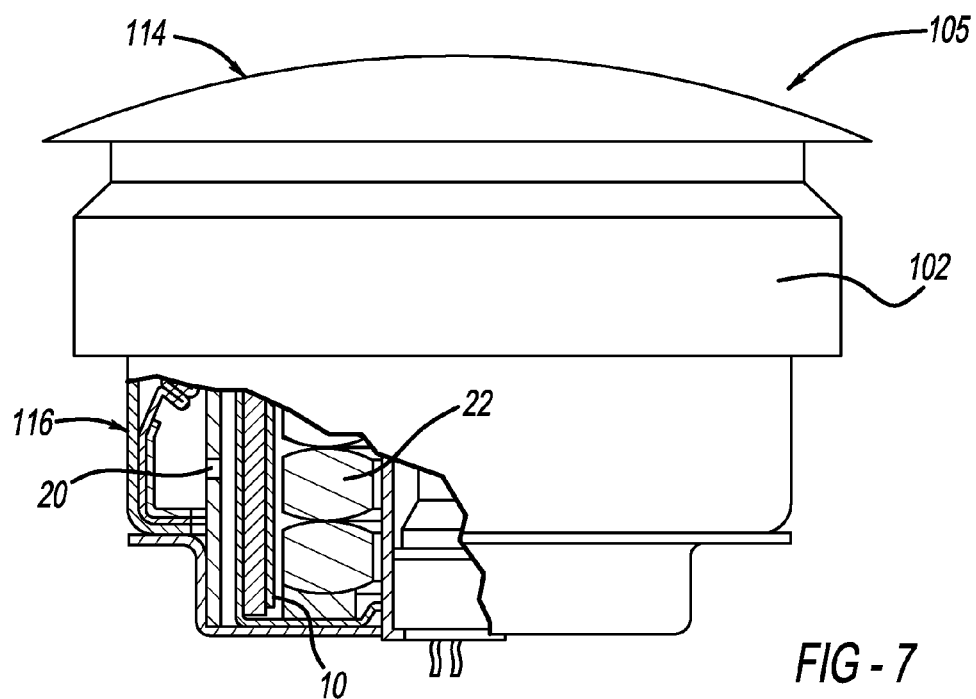
FIG. 7 is a partial cross-sectional side view of an airbag module employing a gas generating system including a combustion control mechanism in accordance with an embodiment described herein.

FIG. 7 shows a particular application of a gas generating system incorporating a combustion control mechanism in accordance with one of the embodiments described above. Referring to FIG. 7, the gas generating system 10 may be incorporated into a driver side airbag module 105. Airbag module 105 comprises a module housing 102 having a rupturable frontal closure 114, an airbag 116, and a gas generating system 10 in accordance with one of the embodiments previously described. An exemplary gas generating system construction suitable for use in airbag module 105 is described in U.S. Pat. No. 6,422,601, incorporated herein by reference. As described above, gas generating system housing 12 contains openings 20 in fluid communication with an interior of airbag 116, for effecting discharge of gas produced by gas generants 22 and 80 (not shown).

Figure 8:
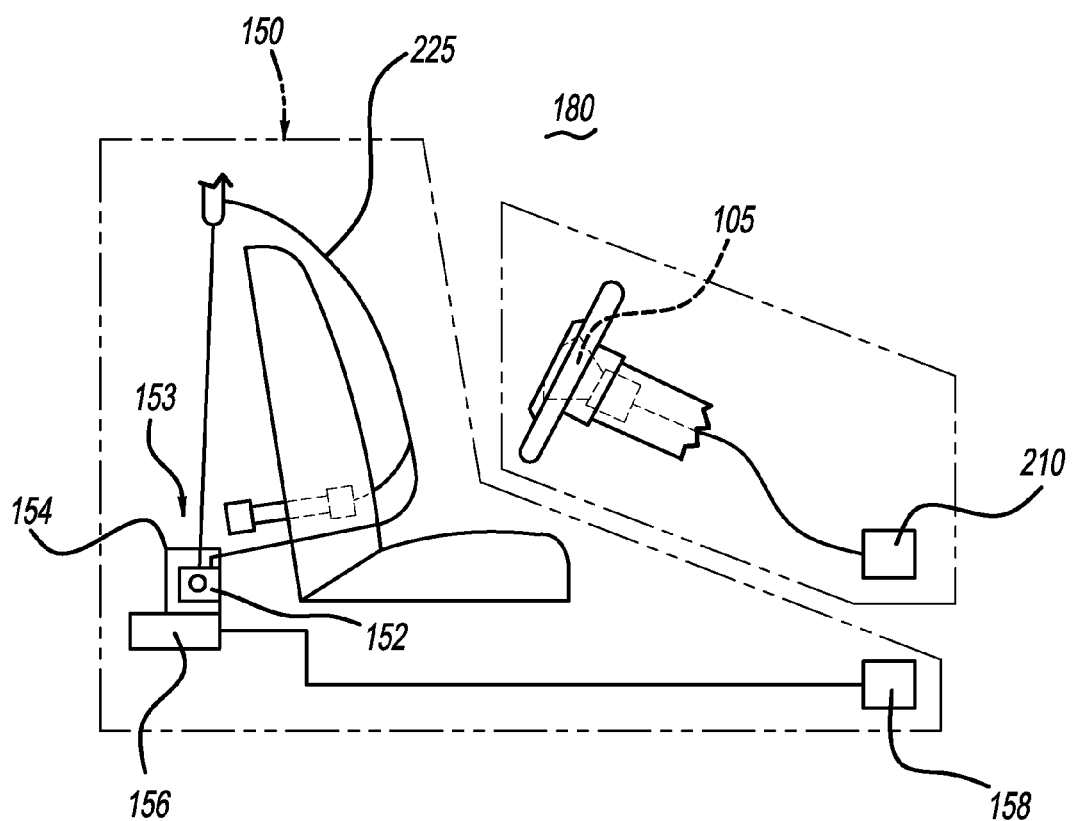
FIG. 8 is a schematic representation of an exemplary vehicle occupant protection system incorporating a combustion control mechanism in accordance with an embodiment described herein.

Referring again to FIG. 8, airbag module 105 or any of the gas generating system embodiments described above may be incorporated into a broader, more comprehensive vehicle occupant protection system 180 including additional elements such as, for example, a safety belt assembly 150. FIG. 8 shows a schematic diagram of one exemplary embodiment of such a protection system. Airbag module 105 may be in communication with a crash event sensor 210 which is in communication with a known crash sensor algorithm that signals actuation of airbag module 105 via, for example, activation of initiators 26 and 88 (FIGS. 1 and 2) in the event of a collision.

Safety belt assembly 150 includes a safety belt housing 152 and a safety belt 225 extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 225 are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt 225 may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic initiator (not shown) incorporated into the pretensioner. U.S. Pat. Nos. 6,505,790 and 6,419,177, previously incorporated herein by reference, provide illustrative examples of pretensioners actuated in such a manner.

Other inflation fluid sources are also contemplated for use in the embodiments described herein. For example, in an alternative embodiment (not shown), housing 12 may be configured to contain a pressurized gas in the portion of the housing interior which is exterior of shell 84 and cup 25. This gas may be released by rupturing shims 56 in any suitable manner. Alternatively, a vessel containing a pressurized gas may be positioned within housing 12 for use as the first inflation fluid source.

It is important to note that the construction and arrangement of the gas generating system as shown in the various exemplary embodiments described herein is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, unless otherwise specified, elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention.

What is claimed is:

1. A gas generating system comprising a primary combustion chamber and a secondary combustion chamber, the secondary chamber including:
 a shell;
 a cap secured to the shell such that the cap is movable in a first direction responsive to a pressure differential wherein a pressure within the shell is greater than a pressure exterior of the shell; and
 at least one gas flow passage defined between the shell and a cavity defined along an exterior surface of the cap,
 wherein a portion of the exterior surface of the cap that defines an open end of the cavity is positioned entirely within the shell and remains in the shell before, during, and after combustion of gas generant in the primary and secondary combustion chambers.

2. The system of claim 1 wherein the cavity has a closed end opposite the open end, and wherein the closed end is positioned so as to exit the shell responsive to movement of the cap in the first direction, thereby forming a gas exit opening enabling gas flow from the shell.

3. An airbag module comprising a gas generating system in accordance with claim 1.

4. A vehicle occupant protection system comprising a gas generating system in accordance with claim 1.

5. A vehicle comprising a gas generating system in accordance with claim 1.

6. The system of claim 1 wherein the at least one gas flow passage comprises a plurality of gas flow passages, each of said gas flow passages defined between the shell and by an associated cavity defined along the exterior surface of the cap.

7. The system of claim 6 wherein a first passage of the plurality of passages has a first length and a second passage of the plurality of passages has a second length different from the first length.

8. A gas generating system comprising a primary combustion chamber and a secondary combustion chamber, the secondary chamber including a shell and a cap secured to the shell such that the cap is movable in a first direction responsive to a pressure differential wherein a pressure within the shell is greater than a pressure exterior of the shell, wherein the cap and the shell define at least one gas flow passage therebetween, the at least one gas flow passage being structured such that a cross-sectional area of an entry into the at least one gas flow passage from the secondary chamber remains constant as the cap moves in the first direction, wherein the entry into the at least one gas flow passage is defined by a portion of an outer perimeter surface of the cap and an inner surface of the shell, and the portion of the cap defining the entry remains in the shell before, during, and after combustion of gas generant in the primary and secondary combustion chambers.

9. The system of claim 8 wherein the cap and the shell are structured to form a plurality of gas flow passages therebetween.

10. The system of claim 8 wherein the cap is movably secured to the shell so as to prevent fluid communication between the primary and secondary chambers prior to activation of the gas generating system.

11. The system of claim 8 wherein the portion of the cap defining the at least one gas flow passage is positioned within the shell prior to activation of the gas generating system.

12. An airbag module comprising a gas generating system in accordance with claim 8.

13. A vehicle occupant protection system comprising a gas generating system in accordance with claim 8.

14. A vehicle comprising a gas generating system in accordance with claim 8.

15. The system of claim 8 wherein the at least one gas flow passage comprises a gas exit opening, and a cross-sectional area of the gas exit opening increases as the cap moves in the first direction.

16. The system of claim 15 wherein the cap and the shell are structured such that motion of the cap in the first direction is limited to a first distance from the shell, by contact with another element of the gas generating system, and wherein a ratio $D/d_{SHELL}$ is within the range $0 < D/d_{SHELL} < 0.5$, where $d_{SHELL}$ is an outer radius of the shell and $D$ is the first distance from the shell moved by the cap.

17. The system of claim 8 wherein the secondary combustion chamber resides within the primary combustion chamber.

18. The system of claim 17 wherein the cap is structured so as to abut the shell to form a substantially gas-tight seal therebetween responsive to a pressure differential wherein a pressure exterior of the shell is greater than a pressure inside the shell.

19. The system of claim 8 wherein the portion of the outer perimeter surface of the cap defines a cavity extending along the outer perimeter surface of the cap.

20. The system of claim 19 wherein the cavity has an open end positioned within the shell and a closed end opposite the open end, and wherein the closed end is positioned so as to exit the shell responsive to movement of the cap in the first direction, thereby forming the gas exit opening.

21. A gas generating system comprising a primary combustion chamber and a secondary combustion chamber, the secondary chamber including:
 a shell;
 a cap secured to the shell such that the cap is movable in a first direction responsive to a pressure differential wherein a pressure within the shell is greater than a pressure exterior of the shell; and
 a plurality of gas flow passages, each passage bounded by the shell and by an associated cavity extending along an exterior of the cap,
 wherein a first passage of the plurality of passages has a first length and a second passage of the plurality of passages has a second length different from the first length.

* * * * *